US011475063B2

(12) United States Patent
Li et al.

(10) Patent No.: US 11,475,063 B2
(45) Date of Patent: Oct. 18, 2022

(54) DEVICE, SYSTEM AND METHOD FOR PROVIDING INDICATIONS OF A DISCREPANCY BETWEEN A VIDEO AND A TEXTUAL DESCRIPTION OF AN INCIDENT

(71) Applicant: MOTOROLA SOLUTIONS, INC., Chicago, IL (US)

(72) Inventors: Zili Li, Chicago, IL (US); Mariya Bondareva, Chicago, IL (US); Walamitien H. Oyenan, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 347 days.

(21) Appl. No.: 16/798,658

(22) Filed: Feb. 24, 2020

(65) Prior Publication Data
US 2021/0263965 A1 Aug. 26, 2021

(51) Int. Cl.
*G06F 16/783* (2019.01)
*G06N 20/00* (2019.01)
*G06V 20/40* (2022.01)
*G08B 13/196* (2006.01)

(52) U.S. Cl.
CPC ......... *G06F 16/7844* (2019.01); *G06N 20/00* (2019.01); *G06V 20/41* (2022.01); *G08B 13/19613* (2013.01); *G08B 13/19671* (2013.01)

(58) Field of Classification Search
CPC .... G06F 16/7844; G06N 20/00; G06V 20/41; G08B 13/19613; G08B 13/19671
See application file for complete search history.

(56) References Cited

U.S. PATENT DOCUMENTS

| 8,195,038 | B2 | 6/2012 | Liu et al. | |
|---|---|---|---|---|
| 10,438,212 | B1 | 10/2019 | Jilani et al. | |
| 10,729,502 | B1* | 8/2020 | Wolf | G16H 20/40 |
| 2009/0132924 | A1 | 5/2009 | Vasa et al. | |
| 2018/0189913 | A1* | 7/2018 | Knopp | G06Q 50/265 |
| 2018/0268305 | A1* | 9/2018 | Dhondse | G06N 5/04 |
| 2020/0167712 | A1* | 5/2020 | Stracquatanio | G06F 3/012 |
| 2020/0273575 | A1* | 8/2020 | Wolf | G16H 15/00 |
| 2020/0301896 | A1* | 9/2020 | Borsos | G06F 16/215 |
| 2020/0358729 | A1* | 11/2020 | Stawiszynski | H04L 65/1083 |
| 2021/0191963 | A1* | 6/2021 | Walton | G06F 16/34 |

OTHER PUBLICATIONS de Boer, Maaike, et al., "Improving Video Event Retrieval By User Feedback", https://link.springer.com/article/10.1007/s11042-017-4798-3, Published online: May 12, 2017.
Davidson, James, et al., "The Youtube Video Recommendaton System", Google.com, https://www.researchgate.net/publication/221140967_The_YouTube_video_recommendation_system, pp. 293-296, Conference Paper: Jan. 2010.

* cited by examiner

*Primary Examiner* — Asghar H Bilgrami
(74) *Attorney, Agent, or Firm* — Perry + Currier, Inc.

(57) ABSTRACT

A device, system and method for providing indications of a discrepancy between a video and a textual description of an incident. A public-safety computing device determines a discrepancy between a video of an incident and a textual description of the incident, the textual description being a component of a public-safety incident report associated with the incident. The device, in response to determining the discrepancy, controls a notification device to provide an indication of the discrepancy.

16 Claims, 5 Drawing Sheets

US 11,475,063 B2

DEVICE, SYSTEM AND METHOD FOR PROVIDING INDICATIONS OF A DISCREPANCY BETWEEN A VIDEO AND A TEXTUAL DESCRIPTION OF AN INCIDENT

BACKGROUND OF THE INVENTION

Reviewing digital evidence of public-safety incidents, such as videos and incident reports, can be time consuming and prone to error. Furthermore, discrepancies in digital evidence may lead to loss of time in pursuing charges for public-safety incidents and/or discrepancies in digital evidence may lead to a case dismissal.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
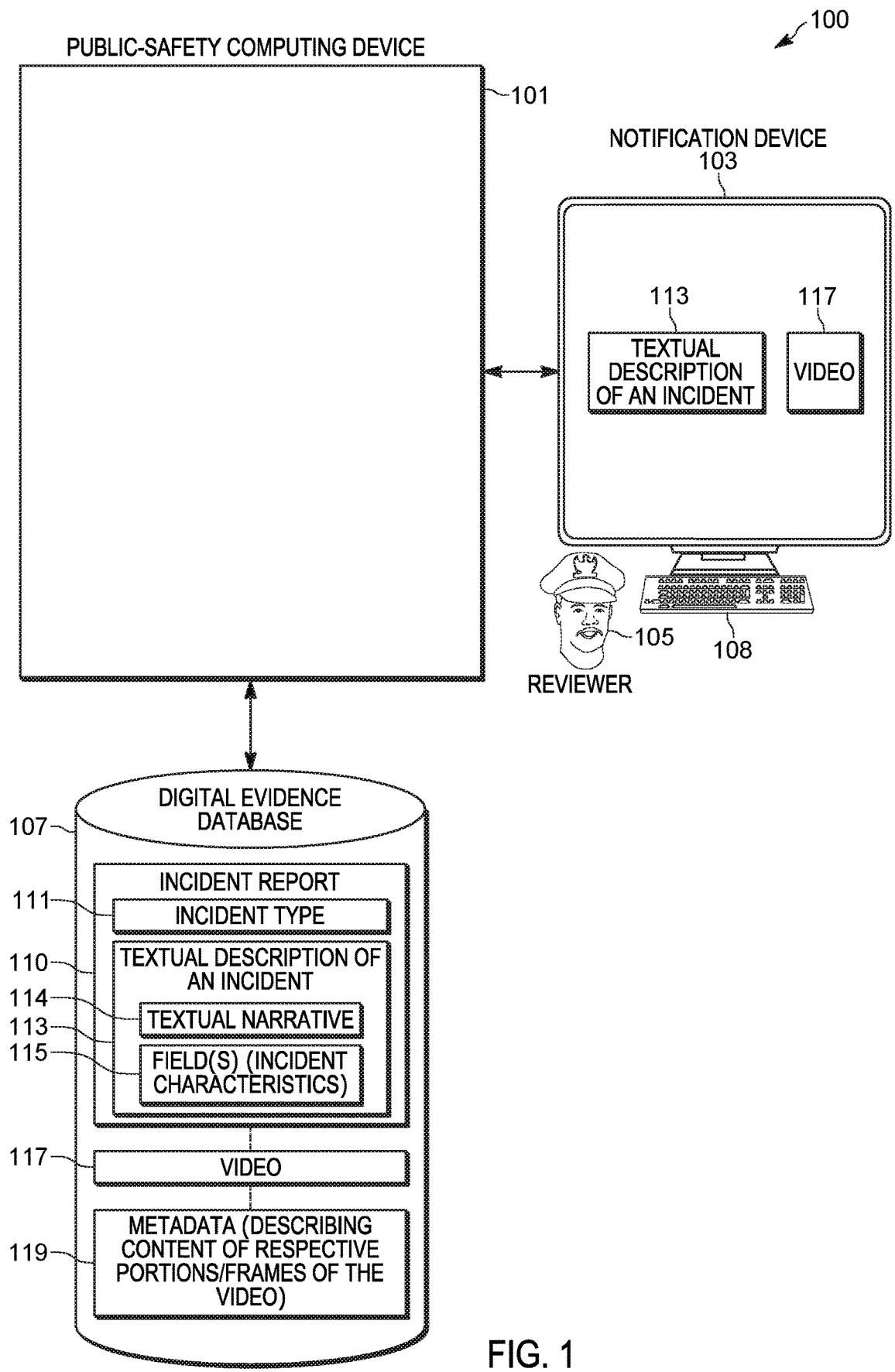
FIG. 1 is a system for providing indications of a discrepancy between a video and a textual description of an incident, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Reviewing digital evidence of public-safety incidents, such as videos and incident reports, can be time consuming and prone to error. Furthermore, discrepancies in digital evidence may lead to loss of time in pursuing charges for public-safety incidents and/or discrepancies in digital evidence may lead to a case dismissal. Furthermore, public safety information systems generally have multiple users (police officers, supervisors, record management clerks, court, etc.), and the users cross-check the data integrity. As a result, data integrity verification may involve a lot of time-consuming and/or costly back-and-forth iterations. For example, a supervisor may return a case to the police officer when a narration in an incident report differs from a related video.

Hence, provided herein is a device, system and method for providing indications of a discrepancy between a video and a textual description of an incident, the textual description comprising a component of a public-safety incident report associated with the incident.

In particular, a public-safety computing device may compare a textual description of an incident with a video of the incident, to determine a discrepancy therebetween, and responsively control a notification device (e.g. of a reviewer, who may be reviewing the textual description and the video) to provide an indication of the discrepancy. The discrepancy may include an omission of a predetermined incident characteristic from the textual description that is present in the video, for example as represented by metadata of the video. The discrepancy may include a difference between the predetermined incident characteristic present in video (e.g. as represented by the metadata of the video), and the textual description. The metadata may generally be predetermined and may describe content of respective portions and/or frames of the video. The predetermined incident characteristic may be determined by determining an incident type of the incident and retrieving the predetermined incident characteristic from a memory and/or a database. The indication of the discrepancy may include a recommendation to review an identified portion of the video where the discrepancy occurs with the textual description, and/or the indication of the discrepancy may comprise a link to the identified portion of the video. Furthermore, portions and/or frames of the video may be rated according to respective importance scores, which indicate an importance and/or presence of discrepancies with the textual narrative therein; such importance scores may be provided in the recommendation to indicate portions and/or frames of the video for review.

An aspect of the specification provides a method comprising: determining, at a public-safety computing device, a discrepancy between a video of an incident and a textual description of the incident, the textual description being a component of a public-safety incident report associated with the incident; and in response to determining the discrepancy, controlling, via the public-safety computing device, a notification device to provide an indication of the discrepancy.

Another aspect of the specification provides a device comprising: a communication unit; and a controller configured to: determine a discrepancy between a video of an incident and a textual description of the incident, the textual description being a component of a public-safety incident report associated with the incident; and in response to determining the discrepancy, control, via the communication unit, a notification device to provide an indication of the discrepancy.

Attention is directed to FIG. 1, which depicts an example system 100 for providing indications of a discrepancy between a video and a textual description of an incident. The system 100 comprises a computing device 101, which may comprise (e.g. as depicted) a public-safety computing device. The computing device 101, interchangeably referred to hereafter as the device 101, is generally configured to communicate with a notification device 103 which may be operated by a reviewer 105. The computing device 101 further has access to a memory and/or database 107 storing digital evidence, as described in more detail below; for example, as depicted, the database 107 may comprise a digital evidence database, described in more detail below. Communication links between components of the system 100 are depicted in FIG. 1, and throughout the present specification, as double-ended arrows between respective components; the communication links may include any suitable combination of wireless and/or wired links and/or wireless and/or wired communication networks.

The computing device 101 may comprise one or more cloud servers and/or one or more premises-based servers, and the like, and may be operated and/or managed by a public-safety agency such as a police force and/or a court system and the like. The computing device 101 will be described in more detail below with reference to FIG. 2. The computing device 101 may generally provide services to the notification device 103 including, but not limited to, processing information from the database 107 and/or generating information for storage at the database 107.

As depicted, the notification device 103 comprises a display screen; however the notification device 103 may include any suitable combination of one or more notification devices such as a display screen, a speaker, and the like. As depicted, the notification device 103 comprises an input device 108, such as a keyboard (as depicted), a pointing device, a mouse, a microphone, and the like. The notification device 103 may hence generally comprise a terminal, which may be operated by the reviewer 105 to review digital evidence stored at the database 107; in particular, the terminal of the notification device 103 may be used by the reviewer 105 to interact with the computing device 101 to review digital evidence stored at the database 107. In some examples, the terminal of the notification device 103 may be used to generate and/or populate incident reports, as described in more detail below, for example by interacting with the computing device 101 which may generate and/or populate incident reports based at the database 107 based on data received from the notification device 103.

As depicted, the reviewer 105 comprises a first responder and/or public-safety officer, and in particular, a police officer, and/or any other suitable reviewer, who is reviewing digital evidence stored at the database 107. Hereafter, the terms first responder and/or public-safety officer will be used interchangeably. However, the reviewer 105 may comprise any suitable reviewer of digital evidence including, but not limited to, a supervisor of a first responder that generated the digital evidence, a records management clerk, an officer of a court, a store manager, an enterprise security consultant or officer, an energy and/or utility site manager, and the like.

As depicted, the database 107 stores a public-safety incident report 110 (interchangeably referred to hereafter as the incident report 110) that includes an incident type 111 of an associated public-safety incident, and a textual description 113 of the associated public-safety incident (interchangeably referred to hereafter as the incident). In some examples, the incident report 110 may include one or more of an enterprise incident report, a commercial incident report, a utility incident report, and the like (that includes an incident type of an associated enterprise incident, a commercial incident, a utility incident, and the like, and a textual description of the associated an associated enterprise incident, a commercial incident, a utility incident related, for example, to public safety). While the database 107 is depicted as storing only one incident report 110, the database 107 may store any suitable number of incident reports and/or any other type of digital evidence. In some examples, the database 107 may further store historic information associated with digital evidence, as described in more detail below, that may be used to assign importance scores to portions of videos, as described in more detail below.

The incident report 110 may have been previously generated and/or populated by the reviewer 105 and/or a first responder dispatched to the incident and/or any other suitable writer of the incident report 110 interacting with a device used to generate the incident report 110 (including, but not limited to, the computing device 101 and/or the terminal of the notification device 103). In particular, the incident report 110 have been generated and/or populated by the reviewer 105 (e.g. interacting with the computing device 101 via the terminal of the notification device 103) who may be the first responder dispatched to the incident, tasked with generating and/or populating the incident report 110, and later been tasked with reviewing the digital evidence associated with the incident including, but not limited to, the incident report 110.

The incident type 111 may comprise a field that includes a type of the incident (e.g. a "ROBBERY", a "HOMICIDE") and the like, which may have been selected from a drop-down list of incident types when the incident report 110 is being generated and/or populated. However, the incident type 111 may be generated and/or populated in any suitable manner.

As depicted, the textual description 113 may comprise one or more of a textual narrative 114 of the incident; and an entry in one or more fields 115. Furthermore, while the incident type 111 is depicted as separate from the textual description 113, in other examples the incident type 111 may be incorporated into the textual description 113 (e.g. as an incident type field). In general, the incident report 110 may be structured in any suitable manner.

The textual description 113 may include any suitable textual description of the incident in any suitable format. For example, textual description 113 and/or the textual narrative 114 may include a written narrative generated by the writer of the incident report 110 which describes, in written sentences, and the like, the incident. For example, the textual description 113 may include, but is not limited to, a textual description of what occurred in the incident, and/or who was involved in the incident (e.g. one or more civilians and/or one or more officers and/or first responders, and the like), among other things.

The fields 115 may comprise one or more structured fields which correspond to predetermined incident characteristics associated with the incident type 111. For example, a given incident type may be associated with a given set of predetermined incident characteristics and hence information used to populate the incident type 111, may define the fields 115 of predetermined incident characteristics that are to be included in the textual description 113 and which may be populated by the writer of the incident report 110 and/or later populated and/or corrected by the reviewer 105, as described below. For example, the incident type 111 may be determined by receiving data indicating a given incident type, and corresponding fields 115 for the incident type 111 may be generated at the textual description 113 (e.g. by the computing device 101) for a given set of predetermined incident characteristics associated with the given incident type.

Hence, the fields 115 may generally depend on the incident type 111 and may include, but are not limited to, descriptors of suspects and/or witnesses of the incident (e.g. a sex and/or height, and/or race of a suspect and/or witness), descriptors of clothing and/or accessory types worn by the suspects and/or witnesses, colors or other descriptors of clothing worn by suspects and/or witnesses, descriptors of objects associated with the incident type 111 (e.g. a car, and the like), colors and/or other descriptors of the objects (e.g. a color of a car, a license plate number of a car, and the like), and/or any other suitable predetermined incident characteristics.

For example, the incident type of a "ROBBERY" may be associated with fields 115 of predetermined incident characteristics that may include a clothing type (e.g. a shirt) worn by suspects and/or witnesses, and a color thereof, and/or any other suitable predetermined incident characteristics. Hence, for example, when the incident type 111 of a "ROBBERY" is populated during generation of the incident report 110, the computing device 101 (e.g. assisting with generating the incident report 110) may automatically generate the fields 115 associated with the incident type 111 of a "ROBBERY", including, but not limited to a field 115 for entering a "SHIRT", and another field 115 for entering a "SHIRT COLOR".

Hence, the textual description 113 may include any suitable textual data describing the incident, in any suitable format, including, but not limited to, one or more of: the incident type 111; the textual narrative 114 of the incident; incident characteristics associated with the incident type 111; the fields 115; descriptions of suspects and/or witnesses of the incident; descriptions of clothing worn by the suspects (and/or the witnesses); descriptions of objects associated with the incident and the like. Furthermore, the textual description 113 is understood to be stored digitally at the database 107 and comprises digital evidence associated with the public-safety incident, and which may be used in prosecuting suspects associated with the public-safety incident, and/or for other purposes.

As depicted, the incident report 110 is stored in association with video 117 of the incident, and the video 117 may also comprise digital evidence associated with the public-safety incident. The video 117 may include, but is not limited to, a series of frames and/or images and/or photo, a single frame and/or image and/or photo, a stream of time-based image captures stored as a video stream, and the like. The video 117 may have been captured by a body-worn camera, and/or other suitable device, of a first responder dispatched to the incident (e.g. and who may have written the incident report 110 and/or the textual description 113). However, the video 117 may have been captured by any video device including, but limited to, security cameras, closed-circuit video devices and the like. In general, the video 117 may comprise portions and/or frames of video (e.g. digital frames which may include index or key frames, predicted frames (unidirectional and/or bidirectional), or other types of compressed or uncompressed video portions) and/or portions and/or frames of images (e.g. digital images, which may be compressed and/or uncompressed) which may be analyzed to generate metadata which describes content thereof.

For example, as depicted, the incident report 110 and/or the video 117 is stored in association with metadata 119 which describes content of respective portions of the video 117, such as content of frames, and the like, of the video 117. The metadata 119 is understood to have been previously generated, for example by a video analysis algorithm, and the like, and may comprise tags and/or labels, and the like, for portions of the video 117, including, but not limited to frames and/or groups of frames, which describe one or more of: persons (e.g., civilians) and/or suspects and/or first responders in the portions of the video 117 (e.g. sex, height, race, and the like), actions being taken by the persons and/or suspects and/or first responders (e.g. "ROBBERY"), clothing worn by the persons and/or suspects and/or first responders (e.g. "RED SHIRT"), words spoken in audio of the portions of the video 117 ("GIVE ME YOUR MONEY"), an incident type in the portions of the video 117 (e.g. "ROBBERY"), objects in the portions of the video 117 (e.g. weapons, cars, and the like), and/or any other suitable metadata. The metadata 119 may further include a time, date, location, a frame number, and the like, at which portions of the video 117 were captured. Hence, in general, the metadata 119 may include data that was omitted from the textual description 113 and/or the metadata 119 may include descriptions of persons and/or suspects and/or objects of the incident that are inconsistent with the textual description 113.

The portions and/or frames of the video 117 may further be indexed for time, and the like, and which may be included in the metadata 119 and/or stored separately therefrom. Regardless, a link (e.g., an actuatable link, similar to a webpage link, and the like) to a portion and/or frame of the video may be generated based on a time of a portion and/or frame of the video 117, and the like.

In general, the computing device 101 is configured to compare the video 117, (and/or the metadata 119) with the textual description 113, and determine whether there are discrepancies therebetween. As will be described hereafter, in response to determining a discrepancy, the computing device 101 may control the notification device 103 to provide an indication of the discrepancy. For example, as depicted, the reviewer 105 is using the notification device 103 to review the textual description 113 and the video 117, and such an indication may include a recommendation to review an identified portion of the video 117, where the discrepancy occurs with the textual description 113, and/or the indication may include a link, and/or an actuatable link, to the identified portion of the video 117. Hence, the reviewer 105 may easily review the identified portion of the video 117 and update the textual description 113 to be more accurate and/or better reflect the digital evidence for the incident as indicated by the video 117. Indeed, both for accuracy, and to reduce a chance that a court case (e.g. for the public-safety incident associated with the incident report 110 and the video 117), may be dismissed for discrepancies in evidence, the computing device 101 may generally control the notification device 103 to provide an indication of the discrepancy to reduce discrepancies therebetween. It is understood, however, that the reviewer 105 may initially be reviewing the textual description 113 or the video 117 at the notification device 103.

Figure 2:
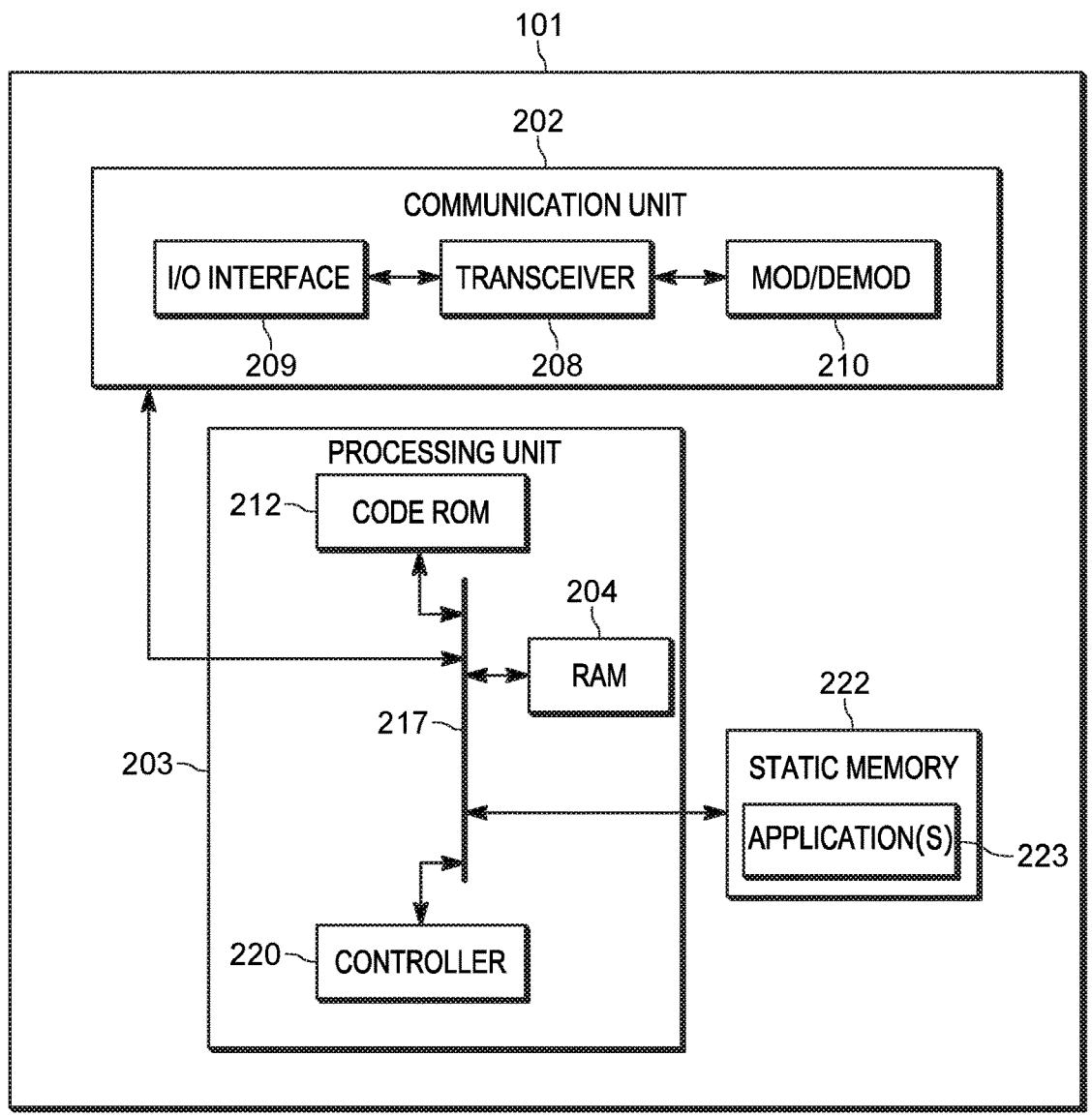
FIG. 2 is a device diagram showing a device structure of computing device for providing indications of a discrepancy between a video and a textual description of an incident, in accordance with some examples.

Attention is next directed to FIG. 2 which depicts a schematic block diagram of an example of the device 101. In general, the device 101 may comprise one or more servers and/or one or more cloud computing devices, and the like, configured to communicate with the notification device 103 and the database 107. However, the device 101 may comprise a computing device such as a personal computer and/or a laptop computer, and the like. In some examples, the device 101 may be combined with the notification device 103 and/or the database 107; hence, in some examples, the computing device 101, the notification device 103 and the database 107 may be combined in a single device.

As depicted, the device 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the device 101 may include one or more of an input device and a display screen and the like, a microphone (e.g. to receive voice commands) so that a user, such as the reviewer 105, may interact with the device 101. However, a user of the device 101, such as the reviewer 105, may interact with the device 101 via a terminal of the notification device 103.

As shown in FIG. 2, the device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the notification device 103 and the database 107. For example, the communication unit 202 may include one or more transceivers 208 and/or wireless transceivers for communicating with the notification device 103 and the database 107. Hence, the one or more transceivers 208 may be adapted for communication with one or more communication networks used to communicate with the notification device 103 and the database 107. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g. a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the device 101 is not a generic controller and/or a generic device, but a device specifically configured to implement functionality for providing indications of a discrepancy between a video and a textual description of an incident. For example, in some examples, the device 101 and/or the controller 220 specifically comprises a computer executable engine configured to implement functionality for providing indications of a discrepancy between a video and a textual description of an incident.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 101 as described herein are maintained, persistently, at the memory 222 and used by the controller 220 which makes appropriate utilization of volatile storage during the execution of such programming instructions.

Figure 3:
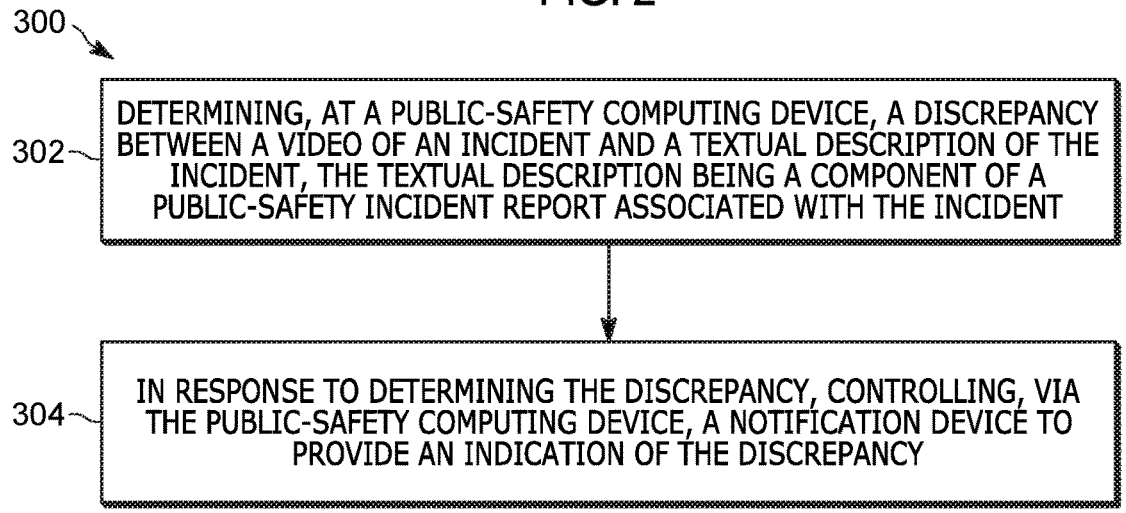
FIG. 3 is a flowchart of a method for providing indications of a discrepancy between a video and a textual description of an incident, in accordance with some examples.

In particular, the memory 222 stores instructions corresponding to the at least one application 223 that, when executed by the controller 220, enables the controller 220 to implement functionality described herein including, but not limited to, some or all of the blocks of the method set forth in FIG. 3

In illustrated examples, when the controller 220 executes the one or more applications 223, the controller 220 is enabled to: determine a discrepancy between a video (e.g. the video 117) of an incident and a textual description (e.g. the textual description 113) of the incident, the textual description being a component of a public-safety incident report (e.g. the incident report 110) associated with the incident; and in response to determining the discrepancy, controlling a notification device (e.g. the notification device 103) to provide an indication of the discrepancy.

The application 223 may include numerical algorithms configured to determine a discrepancy between a video of an incident and a textual description of the incident.

Alternatively, and/or in addition to numerical algorithms, and/or programmed algorithms, predetermined algorithms, and/or static algorithms, the application 223 may include machine learning models and/or algorithms, and the like, which have been trained to determine a discrepancy between a video of an incident and a textual description of the incident. Furthermore, in these examples, the application 223 may initially be operated by the controller 220 in a training mode to train the machine learning models and/or algorithms of the application 223 to perform the above described functionality and/or generate classifiers therefor.

The one or more machine learning models and/or algorithms of the application 223 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. Any suitable machine learning algorithm and/or deep learning algorithm and/or neural network is within the scope of present examples.

Attention is now directed to FIG. 3, which depicts a flowchart representative of a method 300 for providing indications of a discrepancy between a video and a textual description of an incident. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the device 101 determines a discrepancy between a video 117 of an incident and a textual description 113 of the incident, the textual description 113 being a component of a public-safety incident report 110 associated with the incident, as described above. In some examples, the controller 220 and/or the device 101 may determine a discrepancy between the video 117 of the incident and the textual description 113 of the incident using, and/or implementing, one or more machine learning algorithms. However, numerical algorithms, and/or programmed algorithms, predetermined algorithms, and/or static algorithms may be used in addition to machine learning algorithms and/or in place of machine learning algorithms.

The discrepancy may comprise one or more of: an omission of a predetermined incident characteristic from the textual description 113 that is present in the video 117, the predetermined incident characteristic associated with an incident type 111 of the incident; and a difference between the predetermined incident characteristic as present in both the video 117 and the textual description 113 of the incident. However, the discrepancy may comprise any other suitable type of discrepancy.

Furthermore, a discrepancy may be determined in any suitable manner. In particular examples, the controller 220 and/or the device 101 may determine a discrepancy between the video 117 of the incident and the textual description 113 of the incident based on the fields 115 of the public-safety incident report 110 that define predetermined incident characteristics to be determined for the incident, as described above.

For example, the controller 220 and/or the device 101 may determine an incident type of the incident, for example using the incident type 111 of the incident report 110 and/or by analyzing the video 117 and/or the metadata 119 to determine an incident type. As described above, a given incident type may be associated with a given set of predetermined incident characteristics. Whether the fields 115 are present at the textual description 113, or not, and/or whether the incident type 111 has been populated or, not, when an incident type of given type is determined, in any suitable manner, an associated set of predetermined incident characteristics may be determined, for example based on the given type of incident.

In some examples, when a field 115 is present, but not populated with an entry for a respective predetermined characteristic, and/or when a field 115 for the respective predetermined characteristic is not present and the respective predetermined characteristic is also not present in the textual narrative 114 (and/or the textual description 113), a discrepancy may comprise the respective predetermined characteristic (e.g. for a determined incident type) being omitted from the textual description 113, but that is present in the video 117. Hence, for example, a determined incident type may be a "ROBBERY", which has an associated predetermined characteristic of a color of a shirt of a suspect; when a color of a shirt of a suspect is present in the video 117, but omitted from the textual description 113, a discrepancy between the textual description 113 and the video 117 is determined.

In other examples, the controller 220 and/or the device 101 may determine entries for the set of predetermined incident characteristics from the fields 115, for example when present and populated, and/or the controller 220 and/or the device 101 may determine entries for the set of predetermined incident characteristics from the textual narrative 114. The predetermined incident characteristics, as determined from the fields 115 and/or the textual narrative 114 may be compared to the predetermined incident characteristics as determined from the video 117. Hence, for example, when the incident type is a "ROBBERY" and the predetermined incident characteristics indicate a color of a suspect's shirt, such a color may be extracted from both the textual description 113 and the video 117, and compared to each other to determine whether there is a discrepancy therebetween.

For example, the discrepancy may comprise a color of a shirt being present in the video 117, and also present in the textual description 113 (and/or a corresponding field 115), but differing from one another; for example, a color of a shirt of a suspect in the video 117 may be "RED" while a color of a shirt of a suspect written in the textual description 113 may be "GREEN".

Furthermore, the values for the predetermined incident characteristics for the video 117 may be extracted from the metadata 119; for example, the metadata 119 may indicate a "RED SHIRT" in one or more frames of the video 117 and/or for a portion of the video 117.

In some examples where the discrepancy comprises a difference between the predetermined incident characteristic as present in both the video 117 and the textual description 113, the difference, and/or a portion of the video 117 that indicates the difference, may be assigned a score and/or a rating that indicates a degree of the difference. For example, when a color of a shirt of a suspect in the video 117 is "RED" and a color of a shirt of a suspect written in the textual description 113 is "GREEN", a relatively high score and/or rating may be assigned to the difference and/or a portion of the video 117 that indicates the difference; however, when a color of a shirt of a suspect in the video 117 is "RED" and a color of a shirt of a suspect written in the textual description 113 is "FUCHSIA", a relatively low score and/or rating may be assigned to the difference and/or a portion of the video 117 that indicates the difference.

In some examples, where scores are assigned to differences, determining the discrepancy between the video 117 of the incident and the textual description 113 may be threshold based. Put another way, the controller 220 and/or the device 101 may be further configured to determine the discrepancy between the video 117 of the incident and the textual description 113 based on a threshold. For example, using the aforementioned example where a color of a shirt of a suspect in the video 117 is "RED" and a color of a shirt of a suspect written in the textual description 113 is "FUCHSIA", a score assigned to the difference and/or a portion of the video 117 that indicates a degree of the difference, may be below a given threshold; in this example, the difference may be ignored and/or discarded by the controller 220 and/or the device 101. Similarly, using the aforementioned example where a color of a shirt of a suspect in the video 117 is "RED" and a color of a shirt of a suspect written in the textual description 113 is "GREEN", a score assigned to the difference and/or a portion of the video 117 that indicates the difference, may be above a given threshold; in this example, the difference may be not ignored by the controller 220 and/or the device 101. In some examples, scores and/or thresholds may be calculated and/or determined as a function of incident type, and a mapping maintained therebetween (e.g. scores and/or thresholds may mapped and/or stored in association with an incident type) and accessed during implementation of the method 300 to determine scores and/or thresholds to apply for discrepancies associated with a particular incident type. Such a mapping may be stored at the database 107 and/or another suitable database, and retrieved by the controller 220 and/or the device 101, and the like, during implementation of the method 300.

In a simple example, the scores may be on a scale of "1" to "10" and the threshold may be set at "4". Hence, again returning to the aforementioned example where a color of a shirt of a suspect in the video 117 is "RED" and a color of a shirt of a suspect written in the textual description 113 is "FUCHSIA", a score of "3" may assigned to the difference and/or a portion of the video 117; as the score of "3" is below the threshold of "4", the difference may be ignored and/or discarded by the controller 220 and/or the device 101. Similarly, again returning to the aforementioned example where a color of a shirt of a suspect in the video 117 is "RED" and a color of a shirt of a suspect written in the textual description 113 is "GREEN", a score of "10" may assigned to the difference and/or a portion of the video 117; as the score of "10" is above the threshold of "4", the difference may not be ignored. However, any suitable scoring system and/or threshold is within the scope of the present specification. Furthermore, the differences and/or a degree therebetween may be determined in any suitable manner; for example, differences in color may be determined using a CIE (Commission internationale de l'éclairage) color space, and the controller 220 and/or the device 101 may be configured to determine CIE values for colors in the video 117 and assign predetermined CIE values to colors textually identified in textual description 113, with scores determined from differences between the CIE values.

Furthermore, as will be described below, the scores of the differences may be used to assign importance scores to portions and/or frames of the video 117.

In a particular examples, the controller 220 and/or the device 101 may determine the discrepancy between the video 117 of the incident and the textual description 113 of the incident as follows:

The controller 220 and/or the device 101 may determine an incident type of the incident, as described above.

The controller 220 and/or the device 101 may determine a predetermined incident characteristic associated with the incident type of the incident, also as described above.

The controller 220 and/or the device 101 may compare the metadata 119 of the video 117, which describes content of respective portions of the video 117, with the textual description 113 to search for one or more of: an omission of the predetermined incident characteristic from the textual description 113 that is present in the metadata 119 of the video 117; and a difference between the predetermined incident characteristic present in the metadata 119 of the video 117, and the textual description 113. Hence, for example returning to the example of a color of a shirt of a suspect, the controller 220 and/or the device 101 may determine from the metadata 119 that a color of a shirt of a suspect indicated in the metadata 119 is "RED", while a color of a shirt of a suspect indicated in the textual description 113 is "GREEN", which may generally indicate that the textual description 113 is incorrect.

The controller 220 and/or the device 101 may, based on the comparing of the metadata 119 of the video 117 with the textual description 113, determine a portion of the video 117 where the discrepancy occurs with the textual description 113. For example, as given metadata 119 generally is associated with a given portion and/or frame of the video 117, the controller 220 and/or the device 101 may determine the portion and/or frame of the video 117, where the discrepancy occurs with the textual description 113, based on the a time and/or frame number, and the like, associated with the metadata 119 which lead to the discrepancy. Hence, for example, when the metadata 119 for a given portion of the video 117 (e.g. a range of times and/or a range of frame numbers) indicates a shirt that is "RED", and the textual description 113 indicates a shirt that is "GREEN", the given portion of the video 117 may be identified as the portion of the video 117 where the discrepancy occurs.

At a block 304, the controller 220 and/or the device 101, in response to determining the discrepancy (e.g. at the block 304), controls (e.g. via the communication unit 202) a notification device 103 to provide an indication of the discrepancy. In some examples, the controller 220 and/or the device 101 may control the notification device 103 to provide an indication of the discrepancy in response to the discrepancy meeting a threshold, as described above.

For example, the indication may comprise a command and/or message and/or a notification transmitted to the notification device 103 which may cause the notification device 103 to render (e.g. display) the indication at a display device of the notification device 103 and/or cause the notification device 103 to aurally play the indication at a speaker of the notification device 103, and the like. However, the notification device 103 may be controlled to provide the indication in any suitable manner that, for example, alerts and/or notifies the reviewer 105 that a discrepancy between the video 117 and the textual description 113 has been determined, such that the reviewer 105 may review the video 117 and the textual description 113 and resolve discrepancies therebetween (e.g. by updating the textual description 113 to more accurately describe the digital evidence as represented by the video 117).

In some examples, the indication of the discrepancy may include a recommendation to review an identified portion of the video 117 where the discrepancy occurs with the textual description 113, for example as identified via a comparison of the metadata 119 with the textual description 113, as described above and/or in any other suitable manner. In such examples, the identified portion of the video 117 may comprise a time and/or a range of times and/or a frame number and/or a range of frame numbers over which the discrepancy occurs. In other examples, the indication of the discrepancy may include a link, and/or an actuatable link, to the identified portion of the video 117, such that when the link is selected and/or actuated (e.g. via the input device 108, and the like), the identified portion of the video 117 is rendered and/or displayed and/or played at a display device of the notification device 103. For example, when the video 117 is already been rendered and/or displayed and/or played at a display device of the notification device 103 (e.g. the reviewer 105 is initially reviewing the textual description 113 and the video 117), and the like, the selection, and/or an actuation, of the link may cause the controller 220 and/or the device 101 and/or the notification device 103 to play the identified portion of the video 117; when the video 117 is not already been rendered and/or displayed and/or played at a display device of the notification device 103 (e.g. the reviewer 105 is initially reviewing the textual description 113 without the video 117), and the like, the selection, and/or an actuation, of the link may cause the controller 220 and/or the device 101 and/or the notification device 103 to retrieve the video 117 from the database 107, and play the identified portion of the video 117 at the display device of the notification device 103.

In examples where the reviewer 105 is initially reviewing the video 117 without the textual description 113, the controller 220 and/or the device 101 may, in response to determining the discrepancy (e.g. at the block 304), in addition to controlling the notification device 103 to provide the indication, retrieve the textual description 113 from the database 107 and control the notification device 103 to provide the textual description 113; in some of these example, a portion of the textual description where a discrepancy with the video 117 occurs may be visually highlighted. Alternatively, the indication of the discrepancy may include a link, and/or an actuatable link, to a portion of the textual description where a discrepancy with the video 117 occurs.

However, the indication of the discrepancy may comprise any suitable information formatted in any suitable manner.

In some examples, the method 300 may further comprise the controller 220 and/or the device 101: assigning respective importance scores to portions of the video 117, for example based on presence of predetermined incident characteristics associated with an incident type of the incident; and controlling the notification device to provide a recommendation to review one or more of the portions of the video based on the respective importance scores.

The importance scores may be determined in any suitable manner including, but not limited to, the aforementioned scores and/or ratings that indicates a degree of a difference between a predetermined incident characteristic as present in both the video 117 and the textual description 113. In particular, importance scores may be assigned to portions and/or frames of the video 117 based on one or more of the following factors:

The metadata 119, which, as described above, describes and/or defines content of the video 117, which may be rated and/or scored as described above. Alternatively, the metadata 119 may be rated and/or scored based on a type of information described, for example, metadata 119 for portions of the video 117 that indicate persons committing crimes, may be assigned a higher score than portions of the video 117 that indicate persons not committing crimes.

The incident type 111. The incident type 111 may indicate what is important in the video 117. For example, the incident type 111 comprising a "ROBBERY" may indicate that persons in the video 117 are more important than when the incident type 111 comprises a "car accident". Similarly, the incident type 111 comprising a "car accident" may indicate that cars in the video 117 are more important than when the incident type 111 comprises a "ROBBERY". Scores to portions of the video 117 may be assigned accordingly.

Historic user viewing behavior for "similar" videos and incidents. For example, the computing device 101 may track behavior of the reviewer 105 and/or other reviewers when reviewing videos and/or similar videos, for example to determine portions of videos that were previously replayed and/or paused at, and the like. Similar portions of the video 117 may be determined to be important, and scores assigned accordingly. Furthermore, similarity between the video 117 and previous videos may be determined via respective incident type and respective metadata (e.g. videos that are associated with a same incident type may be determined to be similar and/or videos that are associated with same and/or similar metadata may be determined to be similar). Furthermore, it is understood that historic reviewer behavior when reviewing video, including, but not limited to, the aforementioned replaying and pausing, may be good indicators of importance of portions of videos.

Predetermined associations and/or predetermined importance scores of historic textual descriptions of incidents and historic video portions. For example, the textual description 113 may be similar to an historic textual description, and portions of the video 117 may be similar to the associated historic video portions; such similarities may enable the controller 220 and/or the device 101 to recognize similar associations and/or importance of the portions of the video 117, and score the portions accordingly.

Historic rejection feedback. For example previous digital evidence may have been rejected, upon review, for discrepancies between a textual description and an associated video, and when the textual description 113 and the video 117 are similar to the rejected textual description and associated video, the reason for the rejection, and/or the portions of the historic video that lead to the rejection, may be used to score portions of the video 117 accordingly.

Structured incident reports and/or historic structured incident reports. For example, fields 115 of the incident report 110 may be an example of a structure of an incident report, and portions of the video 117 that include the predetermined characteristics associated with the fields 115 may be scored accordingly (e.g. portions of the video 117 that include the predetermined characteristics associated with the fields 115 (e.g. such as a shirt color, to continue with the previous example) may be scored higher than portions of the video 117 that do not include the predetermined characteristics).

Historic location data for a location of an incident. For example, when an incident is of a given incident type at a given location, and the given location of the incident has a given demographic and/or a given incident history and/or a given population density, portions of the video 117 may be scored based on such factors. For example, when an incident is a "BURGLARY" and occurs in a suburban area, historical data for burglaries in the suburban area may indicate that an appearance of a person on a street (e.g. as captured in a portion of a video) may be important as compared to when a burglary is in a densely populated city area (e.g. as fewer people tend to be on a street in a low population density suburban area as compared to a relatively high population density city area). Furthermore, portions of a video may be scored based on behavior of people at the location of an incident. For example, a portion of a video showing a person in a suburban area pausing to view houses may be given a higher score than when similar behavior occurs in a more densely populated city. Similarly, a portion of video showing a person in a city circling a house may be given a higher score as compared to when a person simply stops and looks at a house in the city area.

The aforementioned information may be stored at the database 107 and/or another suitable database, and retrieved by the controller 220 and/or the device 101 when assigning respective importance scores to portions of the video 117, and the like.

In some examples, respective scores may be assigned to portions of the video 117 based on one or more of the aforementioned factors, and a respective importance score and/or a total respective importance may be assigned based on the respective scores using, for example, any suitable weighting system. For example, scores and/or ratings that indicates a degree of a difference between a predetermined incident characteristic as present in both the video 117 and the textual description 113 may be weighted higher than scores for historic user viewing behavior. For example, a difference score for a portion of the video 117 may be "7", and an historic user viewing behavior score may be "1"; however the difference score may be weighted higher (e.g. weighted at 0.8) than the historic user viewing behavior score (e.g. weighted at 0.2) and hence a total importance score (e.g. based on two scores) may be "5.8" (e.g. ((0.8×7)+(0.2×1)). However, any suitable weighting system is within the scope of the present specification. Furthermore, the importance scores may be determined using machine learning algorithms of the application 223, trained to assign importance scores to portions of video based on one or more of the aforementioned factors.

Regardless of how importance scores are determined, a recommendation to review one or more of the portions of the video based on the respective importance scores may be transmitted to the notification device 103 to control the notification device 103 to provide the recommendation, for example at a display device thereof.

Furthermore, importance scores for portions of the video 117 may be determined independently from determining, at the block 302, a discrepancy between a video of an incident and a textual description of the incident; and/or notification device 103 may be controlled to provide a recommendation to review one or more of the portions of a video based on a respective importance scores, independent of the notification device 103 being controlled to provide an indication of the discrepancy. However, in some examples, a recommendation to review one or more of the portions of the video based on the respective importance scores may be combined with an indication of the discrepancy.

Figure 4:
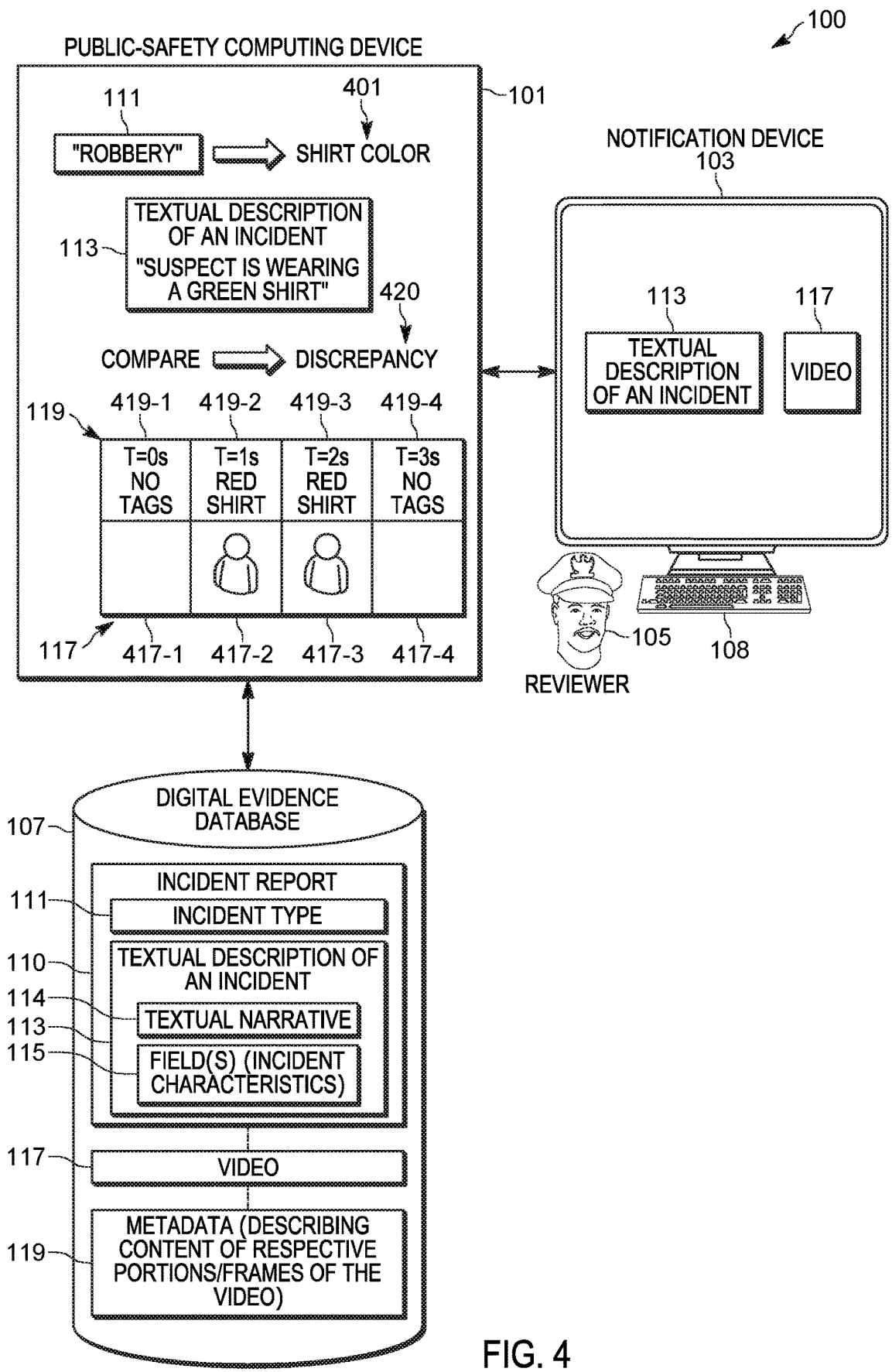
FIG. 4 depicts an example of a method for providing indications of a discrepancy between a video and a textual description of an incident implemented in the system of FIG. 1, in accordance with some examples.
Figure 5:
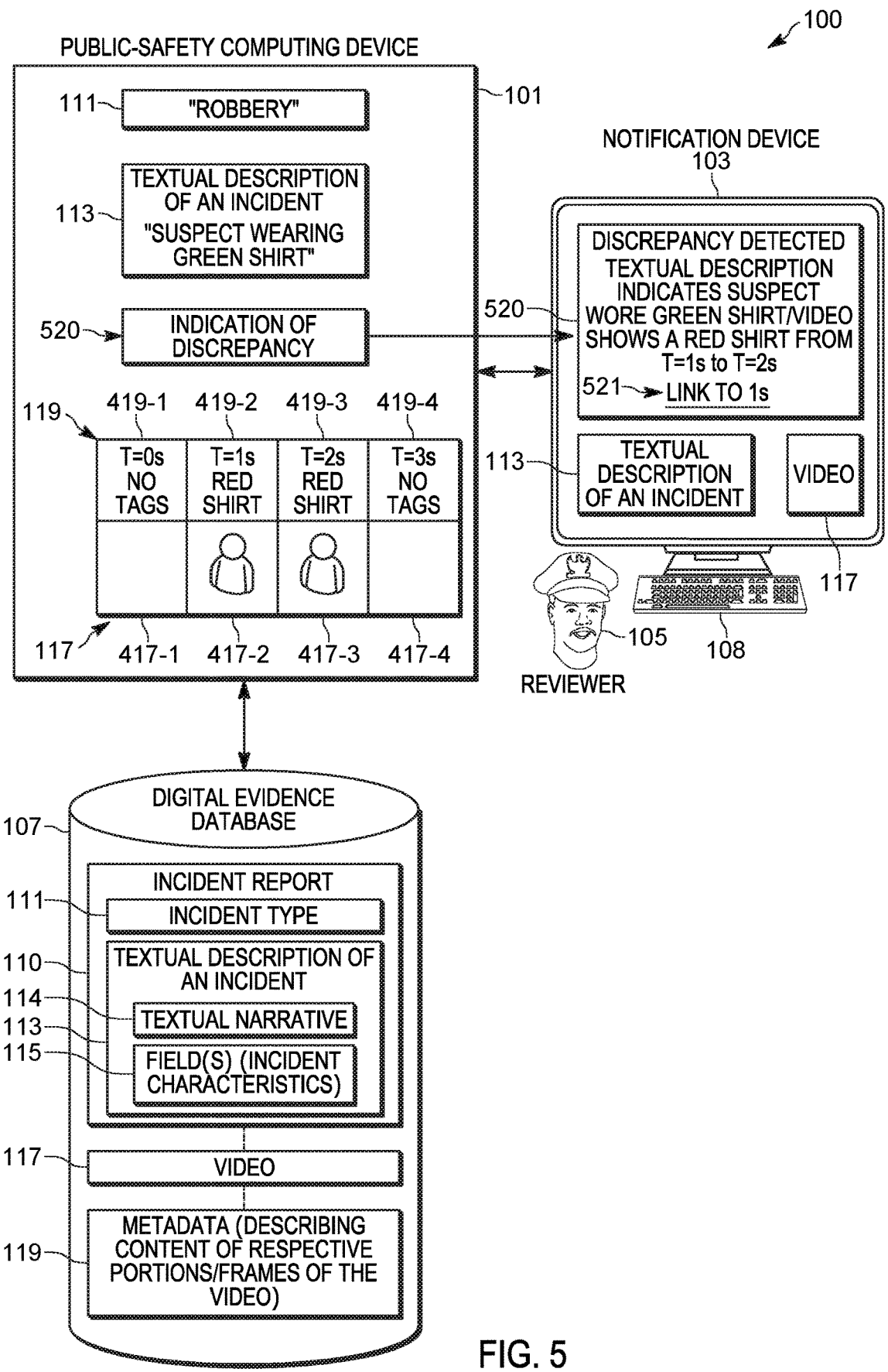
FIG. 5 continues to depict the example of a method for providing indications of a discrepancy between a video and a textual description of an incident implemented in the system of FIG. 1, in accordance with some examples.

Attention is next directed to FIG. 4 and FIG. 5, which depict an example of the method 300. FIG. 4 and FIG. 5 are similar to FIG. 1, with like components having like numbers.

As depicted in FIG. 4, the device 101 has retrieved the incident type 111, the textual description 113, the video 117, and the metadata 119 from the database 107. Furthermore, the device 101 is determining (e.g. at the block 302) a discrepancy between the video 117 and the textual description 113 by comparing the textual description 113 with the metadata 119 of the video 117. While FIG. 4 specifically depicts the device 101 processing both the metadata 119 and the video 117 to perform the comparison, the device 101 may compare the textual description 113 with the video 117 by comparing the textual description 113 with the metadata 119 only (e.g. the video 117 may not be retrieved from the database 107).

In particular, the device 101 has determined, from the incident type 111, that the incident associated with the textual description 113 and the video 117 is a "ROBBERY", and that an associated predetermined characteristic 401 is a "SHIRT COLOR" of a suspect. As such, the device 101 identifies text in the textual description 113 that indicates that a "suspect" in an associated incident "is wearing a green shirt" and/or that the predetermined characteristic 401 of a "SHIRT COLOR" is "GREEN" according to the textual description 113.

Furthermore, as depicted the video 117 includes four portions 417-1, 417-2, 417-3, 417-4, interchangeably referred to hereafter, collectively, as the portions 417 and, generically, as a portion 417. Each portion 417 may comprise a frame and/or an image of the video 117 (when present), and the like. While only four portions 417 are depicted, the video 117 may comprise any suitable number of portions 417 (e.g. a portion 417 may correspond to a frame of the video 117, a sub-frame, a predicted frame, etc.). In some examples, when the video 117 includes a single image capture, one portion 417 (e.g. only one portion 417) may be present (and similarly the one portion 417 and/or the only one portion 417 may be displayed and/or rendered at the display device of the notification device 103).

Furthermore, as depicted the metadata 119 includes four sets of metadata 419-1, 419-2, 419-3, 419-4, interchangeably referred to hereafter, collectively, as the sets of metadata 419 and, generically, as a set of metadata 419. Each set of metadata 419 comprises a description of content of a respective portion 417, as well as a time of a respective portion 417. For example, the set of metadata 419-1 indicates a time of T=0 s (e.g. time equals zero seconds) for the portion 417-1, and that no content has been identified in the portion 417-1 (e.g. "No Tags" and/or labels are in the set of metadata 419-1). However, the set of metadata 419-2 indicates a time of T=1 s (e.g. time equals 1 second) for the portion 417-2, and content of a "Red Shirt" has been identified in the portion 417-2. Similar to the set of metadata 419-2, the set of metadata 419-3 indicates a time of T=2 s (e.g. time equals 2 second)s for the portion 417-3, and content of a "Red Shirt" has been identified in the portion 417-3. Similar to the set of metadata 419-1, the set of metadata 419-4 indicates a time of T=3 s (e.g. time equals 3 seconds)s for the portion 417-4, and that no content has been identified in the portion 417-4.

As such, the device 101 identifies that the predetermined characteristic 401 of a "SHIRT COLOR" is "RED" according to the video 117 and/or the metadata 119.

Hence, the device 101 may determine a discrepancy 420 between the video 117 and the textual description 113, the device 101 may determine a discrepancy between the metadata 119 and the textual description 113, specifically, as depicted, by determining a discrepancy in color of a shirt (e.g. red vs. green) in the metadata 119 and the textual description 113. The device 101 may further determine a portion of the video 117 at which the discrepancy occurs, for example based on the associated times of the sets of metadata 419-1, 419-2.

Attention is next directed to FIG. 5 which depicts an example of the block 304 of the method 300. In particular, in response to determining the discrepancy 420, the device 101 generates an indication 520 of the discrepancy 420 and controls (e.g. at the block 304) the notification device 103 to provide the indication 520 of the discrepancy 420, for example by transmitting the indication 520 to the notification device 103 in the form of a command and/or a message, and the like, which causes the display device of the notification device 103 to render the indication 520. As depicted, the indication 520, as rendered at the display device of the notification device 103, comprises text (e.g. "Discrepancy Detected") indicating that a discrepancy was depicted and in particular text indicating that the "Textual Description Indicates Suspect Wore Green Shirt", while the "Video Shows A Red Shirt". As depicted, the indication 520, as rendered at the display device of the notification device 103 further indicates a portion of the video 117 (e.g. the portions 417-2, 417-3 indicated by a range of times, "T=1 s to T=2 s") where the discrepancy is located. As depicted, the indication 520, as rendered at the display device of the notification device 103 further includes an actuatable link 521 to the portion of the video 117 (e.g. the portions 417-2, 417-3), and specifically the link 521 may be to the beginning of the portion 417-2 of the video 117 (e.g. at T=1 s). When the reviewer uses the input device 108 to select and/or actuate the link 521, the device 101 (and/or the notification device 103) may cause the video 117 to play the portions 417-2, 417-3 of the video 117, starting from the beginning of the portion 417-2. In some examples, the portions 417-2, 417-3 may be played at a reduced speed to allow the reviewer 105 to more carefully review the portions 417-2, 417-3 for the discrepancy 420.

Hence, for example, the reviewer 105 may review the video 117 from the time T=1 s (e.g. the portion 417-2) to the time T=2 s (e.g. the portion 417-3), determine that a shirt of the suspect in the video 117 is "RED" and update the textual description 113 to indicate that shirt of the suspect is "RED" (e.g. rather than "GREEN") thereby resolving the discrepancy between the video 117 and the textual description 113. The device 101 may continue to compare the video 117 and the textual description 113, for example during and/or after the reviewer 105 updating the textual description 113, and responsively determine that the discrepancy 420 between the video 117 and the textual description 113 has been resolved and/or that there is no discrepancy between the video 117 and the textual description 113. As such, the indication 520 may be removed from the display device of the notification device 103 and/or an indication of the discrepancy 420 being resolved may be provided (for example) at the display device of the notification device 103.

Figure 6:
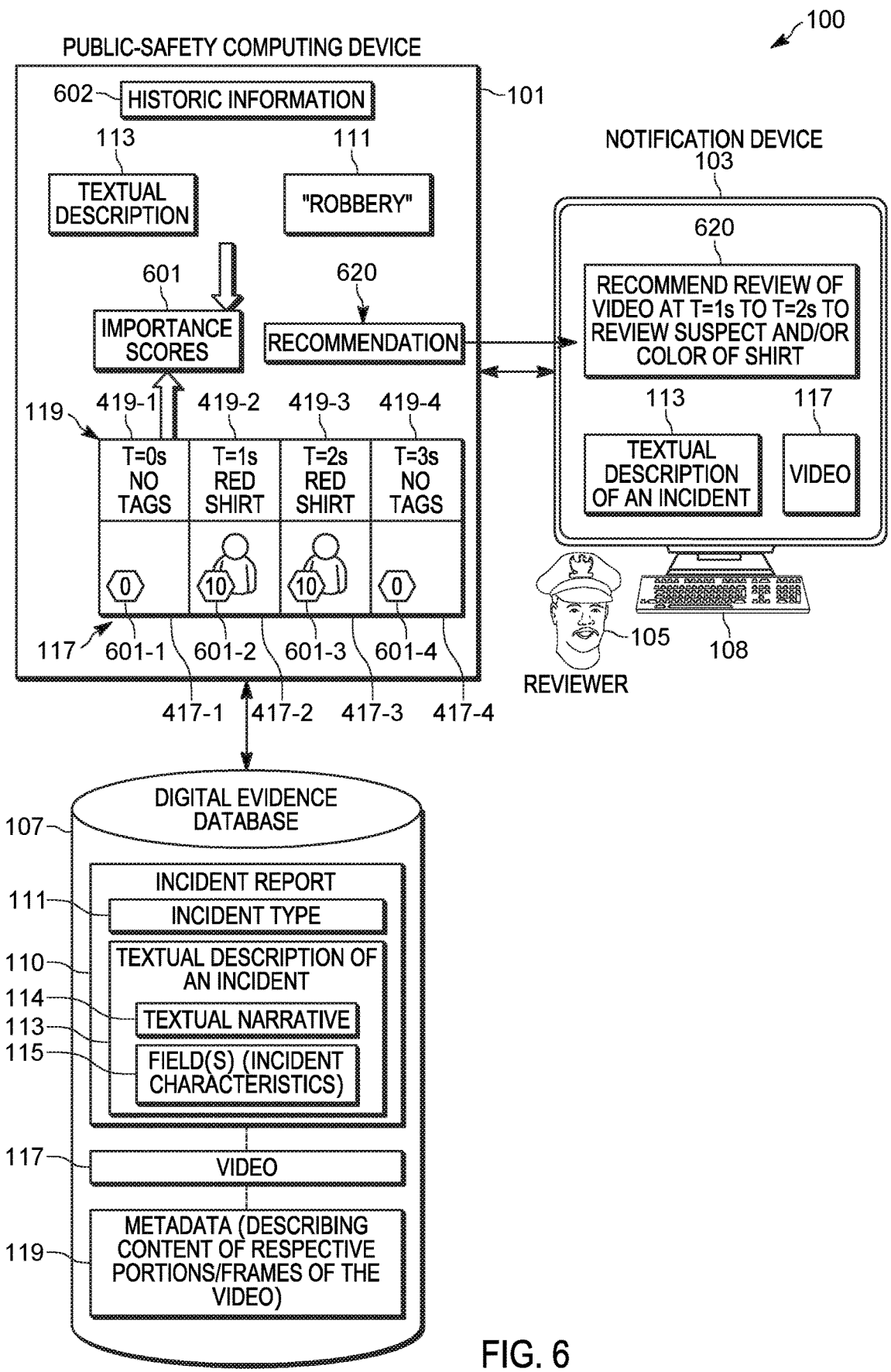
FIG. 6 continues to depict the example of a method for providing a recommendation to review a portion of a video based on importance scores, in accordance with some examples.

Attention is next directed to FIG. 6, which is substantially similar to FIG. 1, with like components having like numbers. However, in FIG. 6, the device 101 is assigning importance scores 601-1, 601-2, 601-3, 601-4 (interchangeably referred to, collectively, as importance scores 601 and, generically, as an importance score 601) to respective portions 417 of the video 117 based on one or more of the metadata 119, the textual description 113, the incident type 111, and/or one or more factors (as described above) determined from historic information 602; the historic information 602 may include, but is not limited to: historic user viewing behavior for "similar" videos and incidents; predetermined associations and/or predetermined importance scores of historic textual descriptions of incidents and historic video portions; historic rejection feedback; historic incident reports and/or historic structured incident reports; historic location data; and the like. While not depicted, the historic information 602 may be stored at the database 107 and/or any other suitable database.

As depicted, the portions 417-1, 417-2, 417-3, 417-4 are assigned respective importance scores 601-1, 601-2, 601-3, 601-4 of "0", "10", "10" and "0". For example, the portions 417-2, 417-3 may be assigned relatively high importance scores 601-2, 601-3 due to the presence of a suspect therein. In some examples, the importance scores 601-1, 601-2, 601-3, 601-4 may be rendered and/or displayed at the video 117 as rendered and/or displayed at a display device of the notification device 103, for example so as to be viewable by the reviewer 105. Where there is more than one discrepancy determined in, and/or assigned to, a single frame of the video 117, and/or a portion thereof, importance scores of the single frame, and the like, may be numerically summed together to generate a total discrepancy score and that total discrepancy scored may be provided (and/or indicated) for that frame. In some examples, local discrepancy scores may be displayed at the video 117 (e.g. rendered and/or displayed at a display device of the notification device 103), within the frame, near, over, and/or adjacent where each discrepancy occurs in a multi-discrepancy frame. Other possibilities exist as well.

As depicted the device 101 generates a recommendation 620 to review one or more of the portions 417 of the video 117 based on the respective importance scores, and controls the notification device 103 to provide the recommendation 620 of the discrepancy 420, for example by transmitting the recommendation 620 to the notification device 103 in the form of a command and/or a message, and the like, which causes the display device of the notification device 103 to render the recommendation 620. In some examples, the device 101 may generate the recommendation 620 in response to an importance score 601 meeting and/or exceeding a threshold, as described above; for example the importance scores 601-2, 601-3 may meet and/or exceed a threshold, while the importance scores 601-1, 601-4 may not meet and/or not exceed a threshold. As depicted, the recommendation 620, as rendered at the display device of the notification device 103, comprises text that recommends a review of the video 117 from a time T=1 s (e.g. the portion 417-2) to a time T=2 s (e.g. the portion 417-3) as a suspect was detected in these time, as was a color of the suspect's shirt. While not depicted, the recommendation 620 may include an actuatable link (e.g. similar to the link 521) to the portions 417 of the video 117 that are recommended for review (e.g. the portions 417-2, 417-3).

Hence, for example, the reviewer 105 may review the video 117 from the time T=1 s (e.g. the portion 417-2) to the time T=2 s (e.g. the portion 417-3), as recommended by the recommendation 620, determine that a shirt of the suspect in the video 117 is "RED" and update the textual description 113 to indicate that shirt of the suspect is "RED" (e.g. rather than "GREEN") thereby resolving a discrepancy between the video 117 and the textual description 113. The device 101 may continue to compare the video 117 and the textual description 113, for example during and/or after the reviewer 105 updating the textual description 113, and responsively update the importance scores 601 accordingly (e.g. the importance scores 601-2, 602-3 may be reduced and/or changed to "0" as the discrepancy between the video 117 and the textual description 113 has been resolved). As such, the recommendation 620 may be removed from the display device of the notification device 103 and/or an indication of the discrepancy being resolved may be provided (for example) at the display device of the notification device 103. When the importance scores 601 are rendered at the video 117 (e.g. at the display device of the notification device 103), the importance scores 601 are updated accordingly.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   determining, at a public-safety computing device, a discrepancy between a video of an incident and a textual description of the incident, the textual description being a component of a public-safety incident report associated with the incident; and
   in response to determining the discrepancy, controlling, via the public-safety computing device, a notification device to provide an indication of the discrepancy,
   wherein determining the discrepancy between the video of the incident and the textual description of the incident comprises:
      determining a predetermined incident characteristic associated with the incident
      comparing metadata of the video, which describes content of respective portions of the video, with the textual description to search for one or more of: an omission of the predetermined incident characteristic from the textual description that is present in the metadata of the video; and a difference between the predetermined incident characteristic present in the metadata of the video, and the textual description; and based on the comparing of the metadata of the video with the textual description, determining a portion of the video where the discrepancy occurs with the textual description.

2. The method of claim 1, further comprising: determining an incident type of the incident, wherein the predetermined incident characteristic is further associated with the incident type of the incident.

3. The method of claim 1, wherein the indication of the discrepancy includes one or more of: a recommendation to review an identified portion of the video where the discrepancy occurs with the textual description; and a link to the identified portion of the video.

4. The method of claim 1, wherein the textual description of the incident comprises one or more of: a textual narrative of the incident in the public-safety incident report; and an entry in a field of the public-safety incident report.

5. The method of claim 1, wherein the determining the discrepancy between the video of the incident and the textual description is based on fields of the public-safety incident report that define predetermined incident characteristics to be determined for the incident.

6. The method of claim 1, wherein the determining the discrepancy between the video of the incident and the textual description is threshold based.

7. The method of claim 1, further comprising:
assigning respective importance scores to portions of the video based on presence of predetermined incident characteristics associated with an incident type of the incident; and
controlling the notification device to provide a recommendation to review one or more of the portions of the video based on the respective importance scores.

8. The method of claim 1, wherein the determining the discrepancy between the video of the incident and the textual description of the incident is implemented using one or more machine learning algorithms.

9. A device comprising:
a communication unit; and
a controller configured to:
determine a discrepancy between a video of an incident and a textual description of the incident, the textual description being a component of a public-safety incident report associated with the incident; and
in response to determining the discrepancy, control, via the communication unit, a notification device to provide an indication of the discrepancy,
wherein the controller is further configured to determine the discrepancy between the video of the incident and the textual description of the incident by:

determining a predetermined incident characteristic associated with the incident
comparing metadata of the video, which describes content of respective portions of the video, with the textual description to search for one or more of: an omission of the predetermined incident characteristic from the textual description that is present in the metadata of the video; and a difference between the predetermined incident characteristic present in the metadata of the video, and the textual description; and
based on the comparing of the metadata of the video with the textual description, determining a portion of the video where the discrepancy occurs with the textual description.

10. The device of claim 9, wherein the controller is further configured to:
determine an incident type of the incident,
wherein the predetermined incident characteristic is further associated with the incident type of the incident.

11. The device of claim 9, wherein the indication of the discrepancy includes one or more of: a recommendation to review an identified portion of the video where the discrepancy occurs with the textual description; and a link to the identified portion of the video.

12. The device of claim 9, wherein the textual description of the incident comprises one or more of: a textual narrative of the incident in the public-safety incident report; and an entry in a field of the public-safety incident report.

13. The device of claim 9, wherein the controller is further configured to determine the discrepancy between the video of the incident and the textual description based on fields of the public-safety incident report that define predetermined incident characteristics to be determined for the incident.

14. The device of claim 9, wherein the controller is further configured to determine the discrepancy between the video of the incident and the textual description based on a threshold.

15. The device of claim 9, wherein the controller is further configured to:
assign respective importance scores to portions of the video based on presence of predetermined incident characteristics associated with an incident type of the incident; and
control the notification device to provide a recommendation to review one or more of the portions of the video based on the respective importance scores.

16. The device of claim 9, wherein the controller is further configured to determine the discrepancy between the video of the incident and the textual description of the incident using one or more machine learning algorithms.

* * * * *